United States Patent
Gruber et al.

(10) Patent No.: US 9,926,837 B2
(45) Date of Patent: Mar. 27, 2018

(54) INTERNAL COMBUSTION ENGINE, IN PARTICULAR A STATIONARY GAS ENGINE, COMPRISING A COMBUSTION CHAMBER

(71) Applicant: GE Jenbacher GmbH & Co OG, Jenbach (AT)

(72) Inventors: Friedrich Gruber, Hippach (AT); Guenther Wall, Bad Haering (AT)

(73) Assignee: GE Jenbacher GmbH & Co OG, Jenbach (AT)

(*) Notice: Subject to any disclaimer, the term of this patent is extended or adjusted under 35 U.S.C. 154(b) by 25 days.

(21) Appl. No.: 14/247,590

(22) Filed: Apr. 8, 2014

(65) Prior Publication Data

US 2014/0216029 A1   Aug. 7, 2014

Related U.S. Application Data

(63) Continuation of application No. PCT/AT2012/000246, filed on Oct. 2, 2012.

(30) Foreign Application Priority Data

Oct. 19, 2011   (AT) .................................. A 1529/2011

(51) Int. Cl.
  *F02B 19/10*   (2006.01)
  *F02B 19/00*   (2006.01)
  (Continued)

(52) U.S. Cl.
  CPC ............... *F02B 19/00* (2013.01); *C01B 3/32* (2013.01); *C10K 1/04* (2013.01); *F02B 19/10* (2013.01);
  (Continued)

(58) Field of Classification Search
  CPC ........ F02B 19/12; F02B 1/04; F02B 19/1004; F02B 43/10; F02B 19/00; F02B 19/10;
  (Continued)

(56) References Cited

U.S. PATENT DOCUMENTS 6,397,790 B1 *  6/2002  Collier, Jr. .............. F02B 43/00
                                                          123/3
6,739,289 B2 *  5/2004  Hiltner .................... F02B 43/10
                                                          123/253
(Continued)

FOREIGN PATENT DOCUMENTS

CN   101821365   9/2010
DE   10 2004 055 407   5/2006
(Continued)

OTHER PUBLICATIONS

International Search Report (ISR) dated Feb. 8, 2013 in International (PCT) Application No. PCT/AT2012/000246.
(Continued)

*Primary Examiner* — David Hamaoui
*Assistant Examiner* — Syed O Hasan
(74) *Attorney, Agent, or Firm* — GE Global Patent Operation; Rita D. Vacca

(57) ABSTRACT

An internal combustion engine, in particular a stationary gas engine, includes a combustion chamber to which a propellant can be fed from a first propellant source via a combustion chamber pipe, and a pre-combustion chamber to which a flushing gas can be fed via a flushing gas pipe. A flushing gas mixer, in which a propellant to be fed via a propellant pipe from the first propellant source or from a second propellant source, and a synthesis gas to be fed via a synthesis gas pipe, can be mixed is provided. A mixer outlet opens into the flushing gas pipe, and the synthesis gas can be generated by a reformer to which a fuel can be fed from a fuel source via a reformer feed pipe. The reformer outlet of the reformer opens into the synthesis gas pipe, and a cooling device for cooling the synthesis gas is provided.

21 Claims, 4 Drawing Sheets

(51) Int. Cl.
| | |
|---|---|
| *C10K 1/04* | (2006.01) |
| *C01B 3/32* | (2006.01) |
| *F02M 21/02* | (2006.01) |
| *F02M 21/06* | (2006.01) |
| *F02D 19/06* | (2006.01) |
| *F02M 25/022* | (2006.01) |
| *F02B 37/00* | (2006.01) |
| *F02B 43/10* | (2006.01) |

(52) U.S. Cl.
CPC ............. *F02B 37/00* (2013.01); *F02B 43/10* (2013.01); *F02D 19/0671* (2013.01); *F02M 21/0227* (2013.01); *F02M 21/0245* (2013.01); *F02M 21/06* (2013.01); *F02M 25/0222* (2013.01); *C01B 2203/0244* (2013.01); *C01B 2203/0495* (2013.01); *C01B 2203/06* (2013.01); *C01B 2203/0894* (2013.01); *C01B 2203/1276* (2013.01); *Y02P 20/129* (2015.11); *Y02T 10/121* (2013.01); *Y02T 10/125* (2013.01); *Y02T 10/16* (2013.01); *Y02T 10/32* (2013.01); *Y02T 10/36* (2013.01)

(58) Field of Classification Search
CPC ........ F02B 37/00; F02M 27/02; F02M 25/12; F02M 21/0227; F02M 21/0245; F02M 21/06; F02M 25/0222; C01B 3/32; C10K 1/04; F02D 19/0671
USPC ............................................. 123/3, 250–293
See application file for complete search history.

(56) References Cited

U.S. PATENT DOCUMENTS

| | | | |
|---|---|---|---|
| 9,127,207 B2* | 9/2015 | Eden | ...................... C10B 49/06 |
| 2003/0111410 A1* | 6/2003 | Branson | .................... C01B 3/34 |
| | | | 210/603 |
| 2009/0047193 A1* | 2/2009 | Corry | ........................ C10J 3/06 |
| | | | 422/200 |
| 2012/0125757 A1 | 5/2012 | Eden | |
| 2013/0055985 A1 | 3/2013 | Gruber et al. | |

FOREIGN PATENT DOCUMENTS

| | | | |
|---|---|---|---|
| DE | 102004055407 | * | 5/2006 |
| DE | 10 2010 029 972 | | 12/2011 |
| WO | 01/75294 | | 10/2001 |
| WO | 2011/007125 | | 1/2011 |
| WO | 2011/127494 | | 10/2011 |

OTHER PUBLICATIONS

Austrian Patent Office Search Report (ASR) dated Mar. 13, 2012 in Austrian Patent Application No. A 1529/2011.
Chinese Search Report dated Oct. 9, 2015 in corresponding Chinese Application No. 201280060078.1.

* cited by examiner

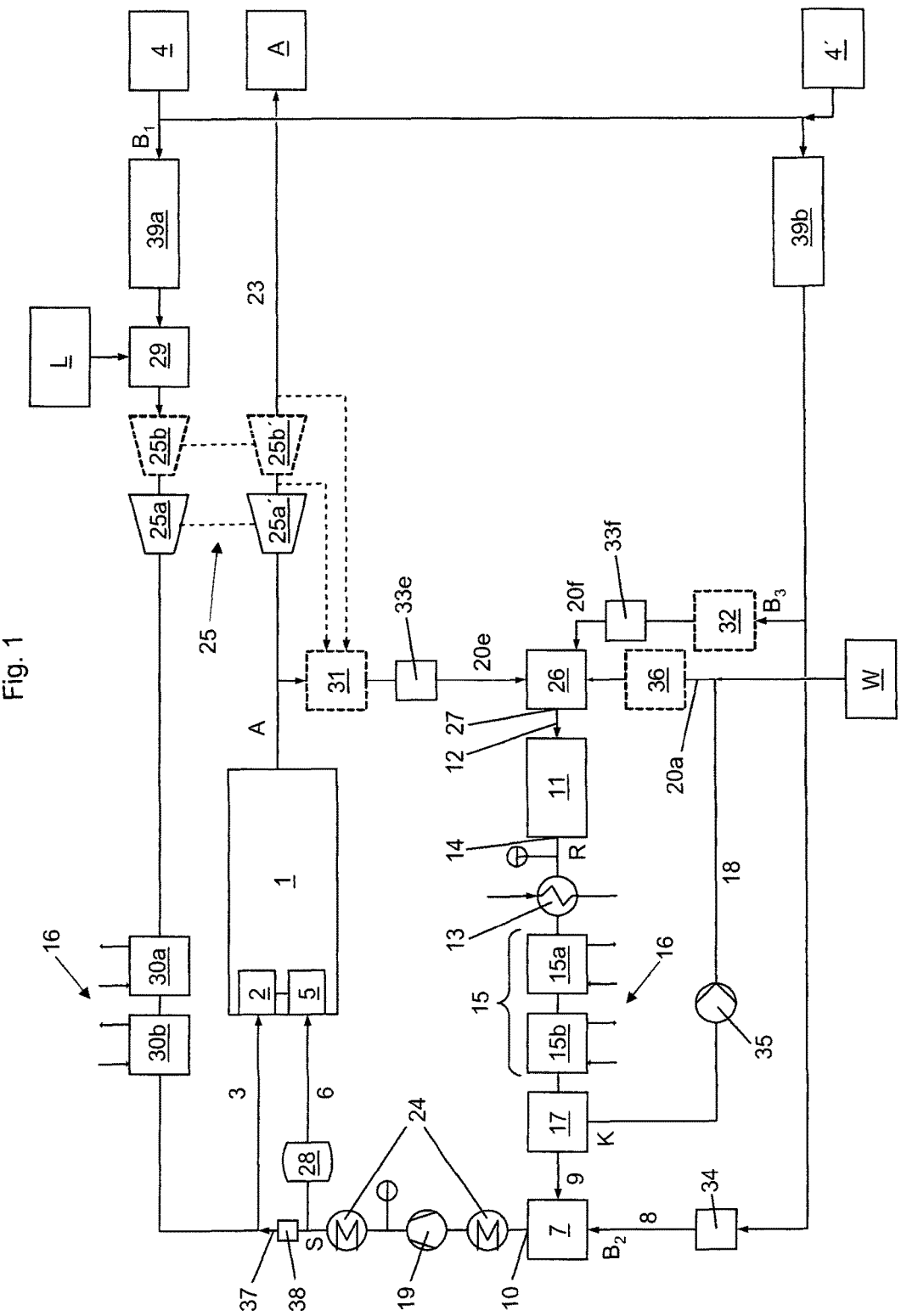

INTERNAL COMBUSTION ENGINE, IN PARTICULAR A STATIONARY GAS ENGINE, COMPRISING A COMBUSTION CHAMBER

BACKGROUND OF THE INVENTION

The invention concerns an internal combustion engine, in particular a stationary gas engine, comprising a combustion chamber to which an engine fuel can be fed from a first engine fuel source by a combustion chamber conduit, and a prechamber to which a scavenging gas can be fed by a scavenging gas conduit. A scavenging gas mixer received an engine fuel which can be fed by an engine fuel conduit from the first engine fuel source or from a second engine fuel source, and a synthesis gas which can be fed by a synthesis gas conduit to be mixed. A mixer outlet opens into the scavenging gas conduit, and the synthesis gas can be produced by a reformer to which a combustion fuel can be fed by way of a reformer feed conduit from a combustion fuel source and the reformer outlet of which opens into the synthesis gas conduit.

In internal combustion engines which are operated on the basis of the Otto cycle, ignition of a fuel-air mixture is effected in the combustion chamber by ignition devices. Mixture ignition is generally initiated by a spark flash-over at the electrodes of a spark plug. Alternatively, it is also known to use a laser spark plug as the ignition device, in which case the required ignition energy is introduced into the combustion chamber in the form of laser light. Particularly in gas engines in which a fuel gas-air mixture is ignited, the lean burn concept is used in relation to larger combustion chamber volumes. That means that there is a relatively great air excess, whereby at maximum power density and at the same time with a high level of efficiency of the engine, pollutant emission and the thermal loading on the components is minimized. Ignition and combustion of very lean fuel-air mixtures represents in that case a considerable challenge for development and operation of modern high-power gas engines.

As from a certain structural size of the gas engines (generally approximately above six liters capacity), it is necessary to use ignition boosters in order to pass through the correspondingly long flame paths in the combustion chambers of the cylinders in the shortest possible time. Prechambers usually serve as such ignition boosters, and the fuel-air mixture which is highly compressed at the end of the compression stroke is ignited in a relatively small secondary chamber separated from the main combustion chamber of the cylinder. In that case, a main combustion chamber is defined by the working piston, the cylinder liner, and the cylinder head surface, and the secondary chamber (the prechamber) is connected to the main combustion chamber by one or more flow transfer bores. Frequently such prechambers are scavenged or filled with engine fuel gas during the charge change phase to enrich the fuel-air mixture and thus improve the flame and combustion properties. For that purpose, a small amount of engine fuel gas is branched from the engine fuel gas feed to the main combustion chamber and introduced into the prechamber by way of a suitable feed device provided with a non-return valve. That amount of engine fuel gas scavenges the prechamber during the charge change and is therefore often referred to as a scavenging gas.

During the compression phase, the very lean fuel-air mixture of the main combustion chamber flows through the flow transfer bores into the prechamber and is there mixed with the scavenging gas. The ratio of engine fuel to air in the mixture is specified in the form of the air excess index $\lambda$. An air excess index of $\lambda=1$ means in that respect that the amount of air present in the mixture precisely corresponds to that amount required to permit complete combustion of the amount of engine fuel. In such a case, combustion takes place stoichiometrically. Under full load, large gas engines are usually operated lean with a $\lambda$ of between about 1.9 and 2.0, that is to say the amount of air in the mixture approximately corresponds to double the stoichiometric amount of air. Scavenging of the prechamber with engine fuel gas, after mixing with the engine fuel gas-air mixture from the main combustion chamber, gives a mean $\lambda$ in the prechamber of between about 0.8 and 0.9. That affords optimum flame production conditions, and by virtue of the energy density intensive ignition flares which issue into the main combustion chamber and which lead to the fuel-air mixture in the main combustion chamber rapidly burning through. With such $\lambda$ values, combustion however takes place at a maximum temperature level so that the wall temperatures in the prechamber region are also correspondingly high. That results on the one hand in a correspondingly high thermal loading on the prechamber and the components arranged therein (for example spark plug, valves), and on the other hand in unwantedly high nitrogen oxide emissions.

With an increasing rise in the engine power output and by virtue of the measures for the increase, the level of efficiency soot formation also increasingly occurs in the prechamber. The soot content resulting therefrom in the engine exhaust gas leads to impairment of heat transfer in the heat recovery steam generator and problems in certain applications of gas engines, for example for $CO_2$ fertilization of greenhouses.

A possible way of avoiding soot formation involves leaning off the fuel-air mixture in the prechamber and oxidizing the free carbon by a slight oxygen excess. In that case, however, other problems arise which are related to the fact that excess oxygen at the very high combustion temperatures just above $\lambda=1$ can lead to hot corrosion at critical locations in the prechamber, in particular at the flow transfer bores and at the spark plug electrodes.

It is also known from the state of the art for the scavenging gas to be fed to a prechamber to be enriched with suitable gases in order to increase the ignition quality of the scavenging gas in lean-burn operation of the internal combustion engine. Thus, U.S. Pat. No. 6,739,289 B2 discloses a method of enriching a prechamber scavenging gas with hydrogen. In that case, the engine fuel for the prechamber is passed through a reformer to enrich the engine fuel with hydrogen. Known thermochemical reactors such as for example steam reformers can be used as the reformer. It is to be noted that the known apparatuses and methods have the disadvantage that a direct feed of the synthesis gas produced by the reformer to the prechambers of the internal combustion engine results in a reduced service life for the prechambers and the components arranged therein.

SUMMARY OF THE INVENTION

The object of the present invention is to provide a remedy here and to achieve an increased service life for the prechamber and the components arranged therein. In particular, the invention seeks to avoid an unwanted thermal loading (for example hot corrosion) of the prechamber and the components arranged therein.

According to the invention, a cooling device is therefore provided for cooling the synthesis gas.

The reforming devices known from the state of the art feed the synthesis gas produced by the reformer directly to the prechambers or the combustion chambers of the internal combustion engine. The synthesis gas from reforming processes is, however, at temperatures of between 500° C. and 900° C. depending on the respective operating point. If now the synthesis gas is introduced into the prechamber at those high temperatures, that results in an increased thermal loading on the components and disadvantages in combustion, for example unwanted self-ignition can be triggered off.

Cooling of the synthesis gas means that the temperature of the scavenging gas fed to the prechamber can be further reduced whereby it is possible to avoid an unnecessarily high thermal loading on the prechamber and the components therein.

Preferably, the cooling device has a first cooling stage and a second cooling stage connected downstream of the first cooling stage. To achieve optimum integration of the reformer operation with the gas engine operation, the cooling device is part of a cooling circuit which also serves for cooling further components of the internal combustion engine, preferably the cylinder liners and/or the cylinder heads.

The reformer can be an autothermal chemical reactor to which a hydrocarbon-bearing combustion fuel (for example natural gas) can be fed from a combustion fuel source to produce the synthesis gas. In a desirable development of the invention, the combustion fuel source for the reformer is the first engine fuel source or the second engine fuel source. In that respect, a single engine fuel source delivers both engine fuel for the combustion chamber and the scavenging gas and also the combustion fuel for the reformer.

The feed of the combustion fuel from a combustion fuel source separate from the first engine fuel source and/or the second engine fuel source is, however, found to be particularly advantageous when a fuel gas which has a very low calorific value is used as the main engine fuel for the internal combustion engine. In those cases, the use of the fuel gas of the internal combustion engine as a starting basis for thermochemical substance conversion in the reformer would entail disadvantageous combustion properties in the prechambers. Using combustion fuels which have a high calorific value and which are present in liquid form for, example for, better storage can produce a synthesis gas which has a relatively high calorific value and which enjoys good combustion properties. The production of a scavenging gas of optimum composition, irrespective of the nature of the main engine fuel for the internal combustion engine, permits markedly better usefulness of engine fuel gases with a very low calorific value. Stack gas or blast-furnace gases, for example, can be named as engine fuel gases with a low calorific value. As alternative scavenging gas combustion fuels, it is possible to use for example diesel fuel or heating oil, LPG (butane or propane) or biogenic combustion fuels like ethanol or methanol.

In a particularly preferred embodiment of the invention, at least one of the following substance flows can be fed to the reformer by way of at least one substance flow conduit: water and/or water vapor and/or air and/or a fuel-air mixture and/or an exhaust gas from the internal combustion engine and/or the combustion fuel.

In order to be able to optimally mix the substance flows to be fed to the reformer, a reforming gas mixer can be provided into which the substance flow conduits open. The substance flows which can be fed to the reformer can be mixed in the reforming gas mixer, and a reforming gas mixer outlet opens into the reformer feed conduit.

To bring the substance flows to be fed to the reformer or the reforming gas mixer to an advantageous pressure level, a compressor can be provided by which the air fed to the reformer and/or the fuel-air mixture fed to the reformer can be compressed.

Also, the air fed to the reformer and/or the fuel-air mixture fed to the reformer can be a partial flow of the air or of the fuel-air mixture for the combustion chamber. The use of a fuel-air mixture which is boosted for the combustion chamber of the internal combustion engine as an $O_2$ substance flow for the reformer provided a substantial energy saving in relation to compression of ambient air in a separate compressor device.

A particular variant provides that there is provided a steam generating device for generating the water vapor which can be fed to the reformer.

In that respect, the steam generating device for generating the water vapor can preferably use exhaust gas heat from the internal combustion engine or the waste heat produced in production of the synthesis gas by the steam generating device arranged in an exhaust gas conduit or in the synthesis gas conduit.

In the context of an integrated reformer gas engine concept, the heating, substance and cooling circuits of the internal combustion engine as well as the pressure level of the internal combustion engine exhaust gas can be used for reforming and shift reaction in the reformer in such a way that the exhaust gas heat is used for heating the substance flows before passing into the reformer—in particular for acceleration from the cold condition —, a part of the exhaust gas for the feed of carbon dioxide ($CO_2$), water ($H_2O$) and oxygen ($O_2$) and the mixed cooling water circuit for recooling of the reformate or synthesis gas.

Inter alia, therefore, an exhaust gas from the internal combustion engine can be fed to the reformer by a substance flow conduit. In that case, that exhaust gas substance flow for the reformer can also be quantitatively regulated by a suitable substance flow valve. A particularly advantageous configuration provides that the exhaust gas can be fed to the reformer before it flows through an exhaust gas turbocharger whereby the pressure level prevailing upstream of the exhaust gas turbine can be appropriately used.

That can be achieved in that the substance flow conduit for the exhaust gas branches from the exhaust gas conduit, preferably upstream of an exhaust gas turbocharger or between exhaust gas turbines of an exhaust gas turbocharger of the internal combustion engine. In the case of multi-stage exhaust gas turbochargers—for example with two exhaust gas turbines, the exhaust gas can accordingly be taken off between the two exhaust gas turbines and is thus at the pressure level prevailing there. It will be appreciated, however, that it is also possible for the exhaust gas to be taken off after it has flowed through the exhaust gas turbocharger and fed to the reformer. In that case, the exhaust gas is at a lower pressure level than upstream of the exhaust gas turbocharger or between the exhaust gas turbines of the exhaust gas turbocharger.

Preferably, an exhaust gas filter is arranged in the substance flow conduit for the exhaust gas. That has a positive effect on the service life of the catalyst surface of the reformer.

Depending on the respective engine operating point exhaust gas is usually composed of the components water vapor at about 11% by volume, carbon dioxide ($CO_2$) at about 5% by volume and oxygen ($O_2$) at about 10% by volume. The balance is formed by nitrogen ($N_2$) and other trace components. The combustion behavior of the internal combustion engine can be influenced by way of the ratio of meteredly added exhaust gas to the combustion fuel to be reformed. With a higher exhaust gas proportion, combustion in the prechamber becomes cooler and the ignition pulse into the combustion chamber becomes weaker. In that way, for example, the combustion duration can be increased and, while tolerating a somewhat worse efficiency of the internal combustion engine, the anti-knock property can be enhanced and maximum cylinder pressure reduced. That can be desirable to achieve optimum adaptation of the combustion procedure in respect of fuel gases with an anti-knock property which changes in respect of time or to operate the internal combustion engine in time-limited mode in an overload mode of operation, for example to deal with peak loads.

It has proven to be advantageous if the amount of combustion fuel fed to the reformer is between about 1 and 2% by volume of the total engine fuel amount of the internal combustion engine. In relation thereto, the amount of exhaust gas fed to the reformer can desirably be between about 3 times and 5 times that gas volume flow.

Besides the energy advantages, exhaust gas also has chemical advantages over the use of water vapor so that in the ideal case, by the use of exhaust gas, it is possible to dispense with a metered addition, separate therefrom, of water vapor.

The higher the proportion of water vapor in the substance flow mixture in the reformer feed conduit, the correspondingly greater is the reaction equilibrium shifted to the side of $H_2$ and $CO_2$ at the expense of CO and the correspondingly lower is the risk of sooting of the catalyst surface of the reformer. The water vapor introduced into the reformer is, however, only partly chemically consumed. The other part leaves the reformer with the synthesis gas. In a preferred embodiment of the invention, a condensate separation device is connected downstream of the cooling device. After recooling of the synthesis gas to for example 45° C., a condensate which occurs in the condensate separation device, preferably water, can be recycled to the reformer by a condensate conduit. In that case, the condensate can be injected directly under pressure into the reformer or a reforming gas mixer or into a substance flow conduit for the exhaust gas of the internal combustion engine or, however, also after vaporization in the form of water vapor into the reformer or the reforming gas mixer or into a substance flow conduit for the internal combustion engine exhaust gas. For vaporization purposes in that case, the waste heat which occurs in production of the synthesis gas or the waste heat from the internal combustion engine, for example the exhaust gas waste heat, can be put to use.

In general, the amounts of the substance flows to be fed to the reformer or the reforming gas mixer (for example water, air, fuel-air mixture, water vapor, exhaust gas, combustion fuel) can be adjusted by suitable substance flow valves and the engine fuel to be fed to the scavenging gas or the scavenging gas mixer or methane ($CH_4$) contained therein can be adjusted by a scavenging gas engine fuel valve, for example, by a suitable control or regulating device. An alteration in the corresponding substance flow and scavenging gas engine fuel amounts can also be implemented by an existing engine management system.

In that way, adjustment and regulation of the composition of the scavenging gas can be effected in accordance with engine operating parameters by regulation of the reformer by way of the amounts of the substance flows and thus reforming of the respectively optimum amount of the combustion fuel and subsequent mixing of synthesis gas with non-reformed engine fuel. Such adjustment and regulation of a suitable scavenging gas composition which is dependent on an operating parameter of the internal combustion engine (for example engine load) permits inter alia optimization of the operation of the engine in regard to level of efficiency, optimization of operation of the engine in regard to emissions and minimization of energy losses by virtue of the high temperatures in the reformer (exothermic reformer reaction). In particular, it is possible in that way to provide that only that amount of hydrogen ($H_2$) which is necessary for optimum scavenging gas properties is produced in the reformer. In that way, even in the case of fluctuating operating conditions of the internal combustion engine and part-load situations, it is possible to guarantee optimum and economical operation. In general, therefore, it is possible to react to change in engine operation (for example part-load) and in that way it is possible to achieve minimal nitrogen oxide emissions ($NO_x$) with at the same time minimization of the soot and total hydrocarbon emissions (THC).

Preferably, the composition of the scavenging gas can be adjusted so that it has a hydrogen proportion of 10-35% by volume and a methane proportion of 10-35% by volume. The hydrogen and methane proportion in the scavenging gas can also be in an analytical function with an operating parameter of the internal combustion engine (for example engine load) and the engine fuel composition.

In terms of a sensor system, in the case of control or regulation of the scavenging gas composition, there can be sensors for hydrogen and/or carbon monoxide and/or carbon dioxide at suitable measurement points known to the man skilled in the art in the internal combustion engine installation. In addition, the volume flows of the substance flows to the reforming gas mixer and to the scavenging gas mixer can be measured at a suitable location with suitable measuring devices. Thus, for example, the gas composition of the synthesis gas can be measured with gas sensors at the reformer outlet and used for metering the substance flows to be fed to the reformer, depending on operating parameters of the internal combustion engine (for example engine load). It is, however, also possible to calculate the synthesis gas and scavenging gas compositions by the measured volume flows of the substance flows and the known operating characteristics of the reformer.

Depending on the respective engine load the scavenging gas must be brought to the appropriate charge pressure, for example between 3 and 4.5 bars(g), that is to say between 3 and 4.5 bars excess pressure in relation to atmospheric pressure of about 1 bar. The substance flows (for example water, air, fuel-air mixture, water vapor, exhaust gas and combustion fuel) for the reforming process to produce hydrogen are, however, not available at that pressure level in the normal situation. Therefore, preferably, a scavenging gas compressor is provided for compressing the scavenging gas to produce the required scavenging pressure. In that respect, control or regulation of the scavenging gas pressure is effected depending on an operating parameter of the internal combustion engine (for example, engine load). It is thus possible to ensure that only a compression energy that is required for a given operating point is involved.

Further, at least one scavenging gas heating device for heating the scavenging gas is provided. In conjunction with specifically targeted recooling and condensate separation of the synthesis gas, it is thus possible to avoid unwanted condensate formation of the scavenging gas and thus damage in the prechamber (for example corrosion). Preheating of the scavenging gas can also be effected using engine waste heat (for example exhaust gas, engine cooling water) or using the synthesis gas heat.

That embodiment of the invention is particularly advantageous in which a scavenging gas buffer is provided in the scavenging gas conduit for intermediate storage of the scavenging gas. That makes it possible to improve the regulatability of the amount of scavenging gas required.

In a further variant, a partial flow of the scavenging gas can be fed to the combustion chamber by a partial flow conduit which opens into the combustion chamber conduit. That is particularly advantageous when regulation of the amount of scavenging gas is effected by a bypass. In general, for stabilization and easier and operationally reliable regulation and control of the thermochemical process in the reformer, it can be advantageous to produce a larger amount of synthesis gas in the reformer than is required for scavenging of the prechambers, with the excess amount being fed together with a fuel-air mixture to the combustion chambers of the internal combustion engine.

In a further variant, a desulfurization device is provided for desulfurization of the combustion fuel. That has a positive effect on the service life of the catalyst surface of the reformer.

BRIEF DESCRIPTION OF THE DRAWINGS

Further details and advantages of the present invention are described by means of the specific description hereinafter. In the drawings:

FIG. 1 is a schematic diagram showing an example embodiment of a proposed internal combustion engine with a reformer and a cooling device for the synthesis gas.

DETAILED DESCRIPTION OF THE INVENTION

Figure 2A:
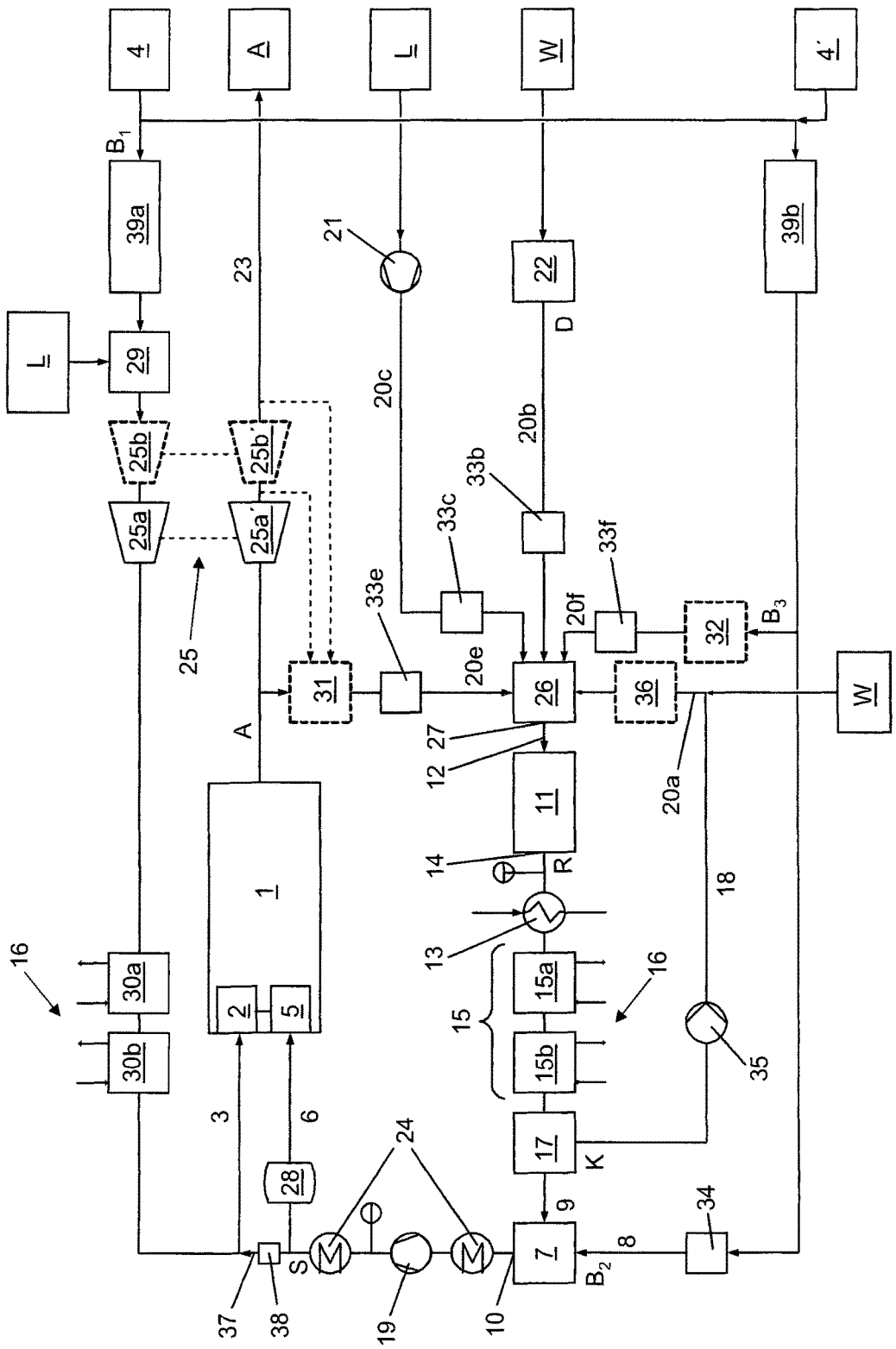
FIG. 2a is a schematic diagram showing a further embodiment of a proposed internal combustion engine with air and water vapor flows for the reformer.

FIG. 1 shows an internal combustion engine 1 comprising a combustion chamber 2 and a prechamber 5 which is associated with the combustion chamber 2 and serves as an ignition booster for the combustion chamber 2. An engine fuel $B_1$ is fed to the combustion chamber 2 from a first engine fuel source 4 by way of a combustion chamber conduit 3. In that arrangement, the first engine fuel source 4 can be a natural gas supply (for example a natural gas pipeline). The engine fuel $B_1$ for the combustion chamber 2 is mixed in this example in a main flow mixer 29 with ambient air L to provide a fuel-air mixture and it is passed through an exhaust gas turbocharger 25. The exhaust gas turbocharger 25 can have one or two compressor stages 25a, 25b (indicated in broken line) which are each connected by a respective shaft (indicated in broken line) to one or two exhaust gas turbines 25a', 25b' in the exhaust gas conduit 23 of the internal combustion engine 1. After being compressed in the compressor stage or stages 25a, 25b the fuel-air mixture is passed through two main flow cooling stages 30a and 30b in order to cool down the fuel-air mixture and thus improve the combustion properties in known manner.

A scavenging gas S is introduced into the prechamber 5 of the internal combustion engine 1 by a scavenging gas conduit 6. That scavenging gas S includes an engine fuel $B_2$ and a synthesis gas R produced in a reformer 11. The synthesis gas R is introduced into a scavenging gas mixer 7 by way of a synthesis gas conduit 9, and the engine fuel $B_2$ is introduced by way of an engine fuel line 8, and mixed. The mixer outlet 10 opens into the scavenging gas conduit 6. The engine fuel $B_2$ introduced into the scavenging gas mixer 7 by way of the engine fuel conduit 8 can originate, for example, from the first engine fuel source 4 and/or a second engine fuel source 4' separate therefrom.

A combustion fuel $B_3$ is fed to the reformer 11 for the reforming process by way of a reformer feed conduit 12. In the specific example illustrated, connected upstream of the reformer feed conduit 12 is a reforming gas mixer 26, into which a plurality of substance flows can be fed by way of substance flow conduits 20a, 20e and 20f, and mixed. Here, therefore, the combustion fuel $B_3$, is fed to the reforming gas mixer 26 by way of the substance flow conduit 20f. Depending on the sulfur loading of the combustion fuel $B_3$ it may be advantageous in terms of component service life for the combustion fuel $B_3$ to be desulfurized prior to being fed to the reforming process, by way of a suitable desulfurization device 32. Desulfurization reduces deactivation of the catalyst and thus increases the service life of the catalyst. The optional desulfurization device 32 is indicated in broken line in the substance flow conduit 20f. The desulfurized combustion fuel $B_3$ can be mixed in the reforming gas mixer 26 with the further substance flows water W and exhaust gas A which can be supplied by way of the substance flow conduits 20a and 20e. The reforming gas mixer outlet 27 then opens into the reformer feed conduit 12.

In this embodiment, the substance flows which can be fed to the reforming gas mixer 26 besides the combustion fuel $B_3$ are water W which can be fed to the reforming gas mixer 26 by way of the substance flow conduit 20a and a partial flow of the exhaust gas A from the internal combustion engine 1, which after optional filtering (indicated in broken line) in an exhaust gas filter 31 can be fed to the reforming gas mixer 26 by way of the substance flow conduit 20e. By virtue of the feed of a partial flow of the exhaust gas A, which for example can occur at a pressure of 4 bars(g) and at a temperature of 500° C. at the substance flow conduit 20e, both the chemical composition of the exhaust gas A, that is desirable for reforming, and also its pressure and temperature levels, can be advantageously used for the reforming process. To take off the exhaust gas A, the substance flow conduit 20e for the exhaust gas A branches off the exhaust gas conduit 23, preferably upstream of an exhaust gas turbocharger 25 or between exhaust gas turbines 25a', 25b' of an exhaust gas turbocharger 25 of the internal combustion engine 1. Also, the exhaust gas A can be branched off downstream of the exhaust gas turbines 25a', 25b' of the exhaust gas turbocharger 25. In the illustrated example, the exhaust gas A is taken off upstream of the exhaust gas turbocharger 25 and thus at a pressure level of, for example, 4 bars(g), the alternative options are indicated in broken line.

When using a single engine fuel source 4 for the engine fuel $B_1$ for the combustion chambers 2 of the internal combustion engine 1, the engine fuel $B_2$ for the scavenging gas S and the combustion fuel $B_3$ for the reformer 11, division of the engine fuel can preferably be effected in such a way that 99% of the engine fuel from the engine fuel source 4 is used for the engine fuel $B_1$ and 1% of the engine fuel is used for the engine fuel $B_2$ and the combustion fuel $B_3$. The engine fuel source 4 can be a natural gas source which provides a natural gas at a pressure of greater than 4 bars(g) and division of that natural gas flow can be effected by means of suitable metering or regulating valves 39a, 39b which are known in the state of the art.

In the illustrated example, the reformer 11 is an autothermal reformer which provides a hydrogen-enriched synthesis gas R at its reformer outlet 14. That synthesis gas R is typically at a temperature of between 500° C. and 900° C. at the reformer outlet 14. A heat exchanger 13 in the synthesis gas conduit 9 can be used for making use of that high temperature of the synthesis gas R. For example, the heat exchanger 13 can be used to heat the substance flows fed to the reforming gas mixer 26 or the entire substance flow mixture which is fed to the reformer 11 downstream of the reforming gas mixer 26 by way of the reformer feed conduit 12. Because heat energy is taken from the synthesis gas R in the heat exchanger 13, the heat exchanger 13 can also be viewed as a cooling device in accordance with the invention. The substance flows fed to the reforming gas mixer 26, however, can also be preheated by other heat exchange devices of the internal combustion engine 1. Thus, for example, the engine waste heat (for example exhaust gas heat) can be put to use to preheat the substance flows.

In the illustrated variant, the synthesis gas R is passed, downstream of the heat exchanger 13, through a cooling device 15 which in this example includes a first cooling stage 15a and a second cooling stage 15b. In the context of an integrated reformer gas engine concept, the cooling device 15 in this variant is part of a cooling circuit 16 which also serves to cool further components of the internal combustion engine 1. In this example, the main flow cooling stages 30a and 30b are also part of the cooling circuit 16. Alternatively or additionally to use of a cooling circuit 16 present in the internal combustion engine 1 it may be advantageous to provide for cooling of the synthesis gas R by way of a cooling circuit independent of the internal combustion engine 1. The cooling energy necessary for that purpose can be afforded, for example, by way of cooling water (for example well water cooling) or a refrigerator.

The synthesis gas R contains a considerable proportion of water vapor from the reforming process and by way of the substance flows introduced thereinto. To prevent unwanted condensate occurring upon cooling of the synthesis gas R below the dew point, as that could lead to engine operation being adversely affected, this embodiment includes, downstream of the cooling device 15, a condensate separation device 17 in which a condensate K can be separated out of the synthesis gas R in a controlled manner. In this case, the condensate K which occurs in the condensate separation device 17 can be recycled to the reformer 11 again by way of a condensate conduit 18. In the illustrated example, the condensate conduit 18 opens into the substance flow conduit 20a by which water W can be introduced into the reforming gas mixer 26. After an increase in pressure in a condensate pump 35, the condensate K in the form of water is injected into the reforming gas mixer 26 or the substance flow conduit 20e for the exhaust gas A of the internal combustion engine 1, by way of the substance flow conduit 20a directly or by way of an optional vaporizer 36 (indicated in broken line). In that case, heat from the exhaust gas A or the synthesis gas R can be used for the vaporization operation.

In order to bring the scavenging gas S to the appropriate charge pressure of about between 3 and 4.5 bars(g) depending on the respective engine load, a scavenging gas compressor 19 is provided in the scavenging gas conduit 6. In addition, the scavenging gas S can be heated before being introduced into the prechamber 5, by way of scavenging gas heating devices 24 arranged in the scavenging gas conduit 6. In this example, a scavenging gas buffer 28 can be arranged in the scavenging gas conduit 6 to improve the regulatability of the scavenging gas amount.

In the illustrated example, a partial flow of the scavenging gas S can be fed to the combustion chamber 2 by way of a partial flow conduit 37 opening into the combustion chamber conduit 3. That is advantageous in particular when regulation of the amount of scavenging gas is to be implemented by way of a bypass formed by the partial flow conduit 37. A suitable quantitative regulating device 38 can be used to regulate that bypass scavenging gas amount.

Additionally or alternatively to the exhaust gas recycling into the reforming gas mixer 26, air and water vapor can also be fed in the form of separate substance flows to the reforming gas mixer 26. That variant is diagrammatically shown in FIG. 2a. In this case, ambient air L is compressed in a compressor 21 and fed to the reforming gas mixer 26 by way of the substance flow conduit 20c. Water W is converted into water vapor D in a steam generating device 22 and that water vapor D is fed to the reforming gas mixer 26 by way of the substance flow conduit 20b.

Figure 2B:
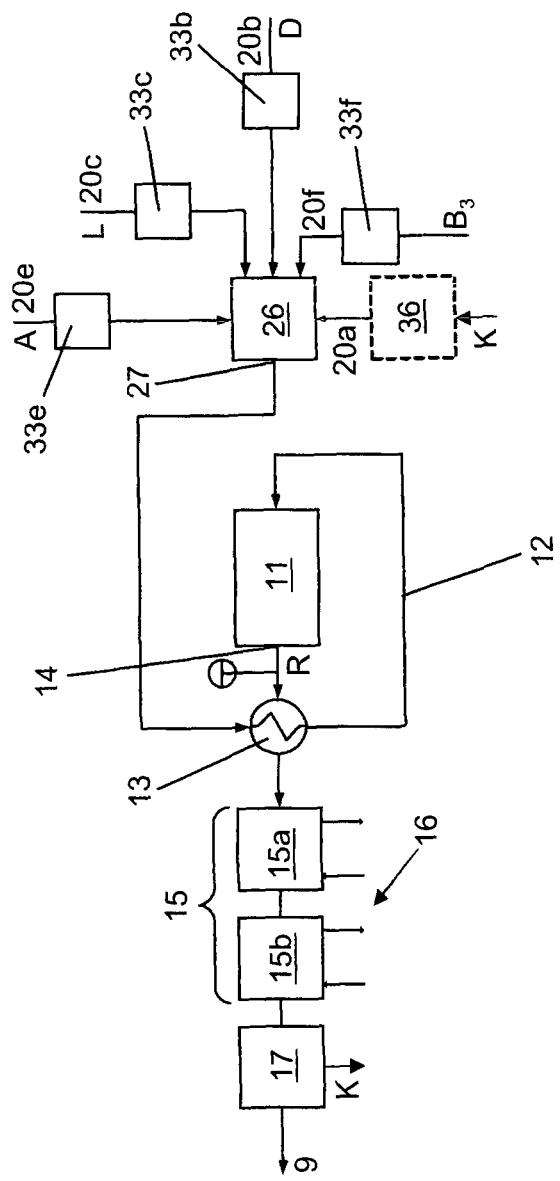
FIG. 2b shows a diagrammatic detail view of a reformer with preheating of the entire substance flow mixture for the reformer.

FIG. 2b diagrammatically shows a detail view of a reformer 11 as illustrated in FIG. 2a. In this case, the synthesis gas heat is used in such a way that the heat removed from the synthesis gas R by a heat exchanger 13 is used to preheat the entire substance flow mixture which occurs at the reforming gas mixer outlet 27. For that purpose, the reformer feed conduit 12 is passed through the heat exchanger 13 and thus the substance flow mixture flowing through the reformer feed conduit 12 is heated. The heat exchanger 13 thus entails a dual use as on the one hand it cools the synthesis gas R and on the other hand it preheats the entire substance flow mixture for the reformer 11.

Figure 3:
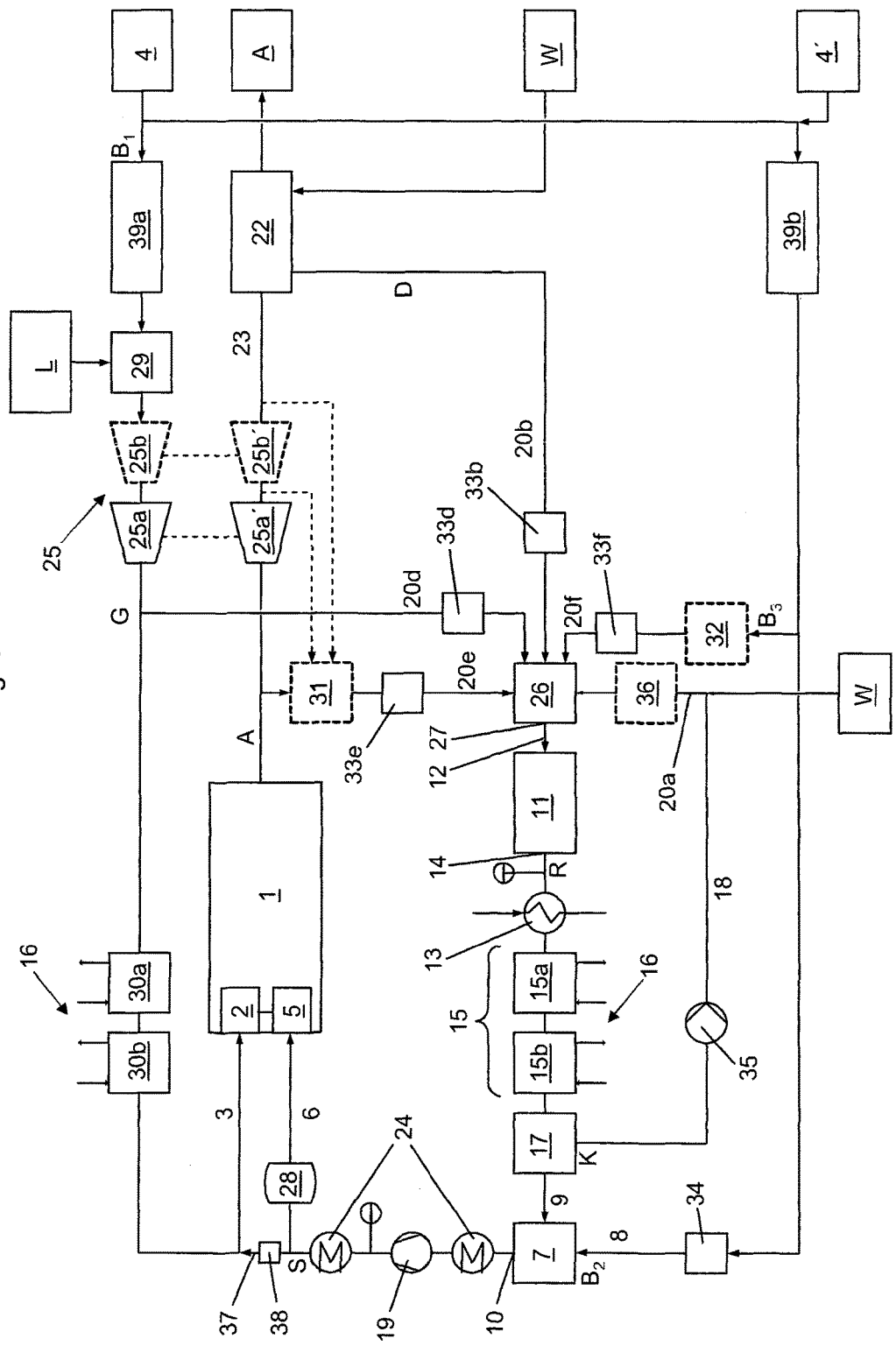
FIG. 3 is a schematic diagram showing a further embodiment of a proposed internal combustion engine having a steam generating device in an exhaust gas conduit of the internal combustion engine and a feed of fuel-air mixture to the reformer.

Instead of compressing the air L by a separate compressor 21, it is also possible for the compressed fuel-air mixture G which occurs at the combustion chamber conduit 3 for the combustion chamber 2 of the internal combustion engine 1 to be fed to the reforming gas mixer 26. That example is diagrammatically illustrated in FIG. 3. In this case, a partial flow of the fuel-air mixture G compressed for the combustion chamber 2 of the internal combustion engine 1 is fed to the reforming gas mixer 26 by way of the substance flow conduit 20d. In addition, in this example, a steam generating device 22 is arranged in the exhaust gas conduit 23 of the internal combustion engine 1 and thus makes use of the exhaust gas heat of the internal combustion engine 1. For the purposes of steam generation in the steam generating device 22, however, it would also be possible to use the high temperature of the synthesis gas R downstream of the reformer 11, using the heat exchanger 13.

The waste heat from the heat exchanger 13 can generally also be used for preheating the substance flows to be fed to the reformer 11 or the reforming gas mixer 26, for preheating the scavenging gas S to reduce the relative moisture content or also for integration into a heat utilization system of the gas engine installation (for example district heating integration).

In the sense of economical waste gas utilization of the overall installation, it is in principle possible to provide for integration of the sensible heat and the condensation heat from synthesis gas cooling by means of heat exchangers 13 and/or a cooling device 15 into the engine cooling water circuits. That can be effected for example in a multi-stage procedure by integration into the engine cooling water system for the purposes of waste heat utilization and/or additional integration into the cooling water circuit of the mixture cooling system. If necessary further cooling and condensation of the synthesis gas R can additionally be effected by way of external cooling (for example well water cooling or refrigerator).

In general the amounts of the substance flows W, D, L, G, A, $B_3$ to be fed to the reformer 11 or the reforming gas mixer 26 by way of the substance flow conduits 20a-20f can be adjusted by way of suitable substance flow valves 33a-33f provided with metering devices and the engine fuel $B_2$ to be fed to the scavenging gas S or the scavenging gas mixer 7 can be adjusted by way of a scavenging gas engine fuel valve 34, for example by way of a suitable control or regulating device. A change in the corresponding amounts of substance flow and scavenging gas engine fuel can also be effected by an engine control or regulating system.

In that way, adjustment and regulation of the composition of the scavenging gas S can be effected depending on at least one engine operating parameter by regulation of the reformer 11 by way of the amounts of the substance flows W, D, L, G, A, $B_3$ and thus reforming of the respectively optimum amount of the combustion fuel $B_3$ and subsequent mixing of the synthesis gas R produced in the reformer 11 with unreformed engine fuel $B_2$. Such adjustment and regulation of a suitable scavenging gas S composition which is dependent on an operating parameter of the internal combustion engine 1 (for example engine load) permits inter alia optimization of the engine operation in respect of efficiency, optimization of the engine operation in respect of emissions and minimization of energy losses. In particular, it is possible in that way to achieve minimal nitrogen oxide emissions ($NO_x$) with at the same time minimization of the soot and total hydrocarbon emissions (THC).

In addition, by using substance and energy flows of the gas engine installation (exhaust gas, engine fuel, fuel-air mixture, cooling water), it is possible to achieve an integrated gas engine-reformer unit. Thus, the use of existing installation components and suitable process-engineering interconnection makes it possible to achieve an efficient overall system. Optimized interrelationship of the substance and energy flows of the internal combustion engine and the reformer unit makes it possible to permit operation of the overall installation, that is as economical as possible.

The invention claimed is:

1. An internal combustion engine comprising:
   a combustion chamber to which an engine fuel is fed from a first engine fuel source via a combustion chamber conduit;
   a prechamber to which a scavenging gas is fed via a scavenging gas conduit;
   a scavenging gas mixer configured to mix an engine fuel fed via an engine fuel conduit from the first engine fuel source or from a second engine fuel source and a synthesis gas fed via a synthesis gas conduit, with a mixer outlet of said scavenging gas mixer opening into said scavenging gas conduit;
   a cooling circuit for cooling components of the internal combustion engine, said cooling circuit including a cooling device for cooling the synthesis gas, said cooling device integrated into a heat utilization system of a gas engine;
   a condensate separation device downstream of said cooling device for separating condensate from the synthesis gas and for supplying separated condensate to a reforming gas mixer; and
   a reformer arranged upstream of the scavenging gas mixer and downstream of the reforming gas mixer for producing the synthesis gas, with a combustion fuel fed to said reformer via a reformer feed conduit from a combustion fuel source, and a reformer outlet of said reformer opening into said synthesis gas conduit.

2. The internal combustion engine as set forth in claim 1, wherein said cooling device includes a first cooling stage and a second cooling stage connected downstream of said first cooling stage.

3. The internal combustion engine as set forth in claim 1, wherein said cooling device is part of a cooling circuit for cooling further components of said internal combustion engine.

4. The internal combustion engine as set forth in claim 3, wherein said cooling circuit is configured to cool at least one of a group consisting of cylinder liners and cylinder heads.

5. The internal combustion engine as set forth in claim 1, further comprising a condensate conduit for supplying condensate produced in said condensate separation device to said reformer.

6. The internal combustion engine as set forth in claim 1, further comprising a scavenging gas compressor for compressing the scavenging gas.

7. The internal combustion engine as set forth in claim 1, wherein the combustion fuel source feeding the combustion fuel to said reformer is the first engine fuel source or the second engine fuel source.

8. The internal combustion engine as set forth in claim 1, further comprising at least one substance flow conduit for feeding at least one substance from a group consisting of water, water vapor, air, a fuel-air mixture, an exhaust gas from the internal combustion engine, and the combustion fuel to said reformer.

9. The internal combustion engine as set forth in claim 8, wherein the reforming gas mixer communicates with said at least one substance flow conduit, is configured to mix the at least one substance, and has a reforming gas mixer outlet opening into said reformer feed conduit.

10. The internal combustion engine as set forth in claim 8, further comprising a compressor for compressing at least one of air fed to said reformer and the fuel-air mixture fed to said reformer.

11. The internal combustion engine as set forth in claim 8, wherein at least one of air fed to said reformer and the fuel-air mixture fed to said reformer forms a partial flow of the air and the fuel-air mixture supplied to said combustion chamber.

12. The internal combustion engine as set forth in claim 8, wherein said at least one substance flow conduit includes an exhaust gas substance flow conduit for supplying the exhaust gas, said exhaust gas substance flow conduit branching from an exhaust gas conduit.

13. The internal combustion engine as set forth in claim 12, wherein said exhaust gas substance flow conduit branches from said exhaust gas conduit upstream of an exhaust gas turbocharger or between exhaust gas turbines of an exhaust turbocharger of said internal combustion engine.

14. The internal combustion engine as set forth in claim 12, further comprising an exhaust gas filter arranged in said exhaust gas conduit.

15. The internal combustion engine as set forth in claim 8, further comprising a steam generating device for generating water vapor to be fed to said reformer.

16. The internal combustion engine as set forth in claim 15, wherein said steam generating device is configured to use one of exhaust gas heat from said internal combustion engine or waste heat produced during production of the synthesis gas by said steam generating device arranged in an exhaust gas conduit or in said synthesis gas conduit.

17. The internal combustion engine as set forth in claim 1, further comprising at least one scavenging gas heating device for heating the scavenging gas.

18. The internal combustion engine as set forth in claim 1, further comprising a scavenging gas buffer in said scavenging gas conduit for intermediate storage of the scavenging gas.

19. The internal combustion engine as set forth in claim 1, further comprising a partial flow conduit for feeding a partial flow of the scavenging gas to said combustion chamber, said partial flow conduit being configured to open into said combustion chamber conduit.

20. The internal combustion engine as set forth in claim 1, further comprising a desulfurization device for desulfurizing the combustion fuel.

21. An internal combustion engine comprising:
- a combustion chamber to which an engine fuel is fed from a first engine fuel source via a combustion chamber conduit;
- a prechamber to which a scavenging gas is fed via a scavenging gas conduit;
- a scavenging gas mixer configured to mix an engine fuel fed via an engine fuel conduit from the first engine fuel source or from a second engine fuel source and a synthesis gas fed via a synthesis gas conduit, with a mixer outlet of said scavenging gas mixer opening into said scavenging gas conduit;
- a first cooling circuit for cooling components of the internal combustion engine;
- a second cooling circuit independent of said first cooling circuit, said second cooling circuit including a cooling device for cooling the synthesis gas, said cooling device integrated into a heat utilization system of a gas engine;
- a condensate separation device downstream of said cooling device for separating condensate from the synthesis gas and for supplying separated condensate to a reforming gas mixer; and
- a reformer arranged upstream of the scavenging gas mixer and downstream of the reforming gas mixer for producing the synthesis gas, with a combustion fuel fed to said reformer via a reformer feed conduit from a combustion fuel source, and a reformer outlet of said reformer opening into said synthesis gas conduit.

* * * * *